United States Patent [19]
Johnson

[11] Patent Number: 4,752,305
[45] Date of Patent: Jun. 21, 1988

[54] DEVICE AND METHOD FOR SEPARATING INDIVIDUAL FLUIDS FROM A MIXTURE OF FLUIDS

[75] Inventor: Homer K. Johnson, Antioch, Calif.
[73] Assignee: The Dow Chemical Company, Midland, Mich.
[21] Appl. No.: 924,951
[22] Filed: Oct. 30, 1986
[51] Int. Cl.[4] .............................................. B01D 13/01
[52] U.S. Cl. .......................................... 55/16; 55/158; 210/321.8; 210/321.89; 210/450
[58] Field of Search ................ 210/500.23, 450, 433.2, 210/321.1, 321.2, 321.3, 321.8, 321.89; 55/16, 158

[56] References Cited
U.S. PATENT DOCUMENTS
4,265,763 5/1981 Bollinger et al. ................ 210/450 X Primary Examiner—Frank Spear
Attorney, Agent, or Firm—V. Dean Clausen

[57] ABSTRACT

A device and method is disclosed for separating individual fluids (particularly gases) from a stream that contains more than one fluid. The separator device is made up of a bundle of hollow fibers fastened into a resin tubesheet at each end of the bundle. The fiber bundle is encased in a tube (casing) and in the center of the bundle is a perforated, distributor tube. Pressure load on one tubesheet is carried by a fixed head in contact with the tubesheet. At the other end of the separator device the tubesheet pressure load is counterbalanced by a floating head that utilizes pressure against its backside. Pressurized fluid directed into the distributor tube flows into the fiber bundle. The permeate fluids pass through the fiber walls and are carried out of the separator device through outlets at each end. The non-permeate fluids bypass the fibers and are carried out of the separator device through one or more outlets in the casing.

4 Claims, 3 Drawing Sheets

DEVICE AND METHOD FOR SEPARATING INDIVIDUAL FLUIDS FROM A MIXTURE OF FLUIDS

BACKGROUND OF THE INVENTION

This invention relates to a device for separating individual fluids from a fluid stream that contains a mixture of permeate and nonpermeate fluids. The fluids are separated by hollow fiber members, in which the permeate fluids penetrate the walls of the hollow fibers and are carried to a collection point. The nonpermeate fluids bypass the fibers and are collected at another point.

There are several conventional devices designed for separating one fluid from another in a mixture of fluids. One of these devices, known as a Generon ® air separation system (The Dow Chemical Company), is specifically designed for separating oxygen and nitrogen from a stream of air. The basic system consists of a bundle of hollow polyolefinic fibers, arranged in parallel fashion. At each end of the fiber bundle the fibers are held together by an epoxy resin tubesheet and the bundle encloses a perforated distributor tube that extends lengthwise through the bundle. The fiber bundle structure fits inside of a metal cylinder (case), so that space is defined between the periphery of the fiber bundle and the case, and between the front face of the tubesheets and the plates that close each end of the cylinder.

In a typical operation of this device, air at high pressure is passed into the open end of the distributor tube (the other end is plugged shut). As the air moves through the distributor tube it flows out of the perforations in the tube and passes into the fiber bundle. The oxygen component readily permeates the walls of the fibers and moves along the fiber bores to discharge outlets at each end of the cylinder. But the nitrogen component won't readily permeate the fiber walls. As a nonpermeate fluid, therefore, the nitrogen bypasses the fibers and is discharged through an outlet at the top of the cylinder.

The air separation module described above is not entirely satisfactory from a design standpoint. When the pressurized air moves into the fiber bundle, the force acting against the backside of each tubesheet causes the tubesheets to bend back and forth (that is, to deflect), because there is no balancing force on the front side of each tubesheet. The deflection puts a considerable amount of stress on the tubesheets at the point where they are joined to the distributor tube. Since the "connection" point is only a small area of each tubesheet, the tube sheet will frequently crack at this juncture, or at some other place.

The present invention overcomes the problem described above. In the embodiment of the invention illustrated herein the force acting against the backsides of each tubesheet is offset by "balancing" forces against the front sides of the tubesheets. The balancing forces are provided by a fixed head in contact with the tubesheet at one end of the fiber bundle, and a floating head in contact with the tubesheet at the opposite end of the fiber bundle. Since the location of the floating head is not fixed, it will apply the balancing force irrespective of any variation in the length of the fiber bundle, or dimensional changes caused by loading, temperature, and other factors.

SUMMARY OF THE INVENTION

The invention is a hollow fiber device for separating individual fluids from a fluid stream that contains a mixture of permeate and nonpermeate fluids. In the description of this invention permeate fluids are defined as fluids that penetrate the walls of the hollow fibers described herein at a faster rate than the nonpermeate fluids. Nonpermeate fluids are defined as fluids that penetrate the fiber walls at a slower rate than the permeate fluids. Basic components of the separation device include an elongate housing and a hollow fiber module that fits inside the housing. The module consists of an elongate, perforated distributor tube enclosed by a bundle of spaced-apart hollow fibers. One end of the distributor tube is open, the other end is closed. At each end of the bundle the fibers fasten into a tubesheet fabricated of a resin material.

At one end of the housing is a fixed head that fits inside the housing. The fixed head is spaced from the tubesheet at that end of the housing, except for a rib portion on the head that makes contact with the tubesheet. At the other end of the housing is a floating head that fits inside the housing and is movable back and forth. The floating head also has a rear face in contact with the tubesheet at that end of the housing. The floating head encloses the hub portion of a floating head flange and the flange has a shoulder portion having a face that is spaced from the front face of the floating head.

A space is defined between the external surface of the bundle and the housing and a fluid outlet in the housing communicates with this space. A second fluid outlet extends through the fixed head and communicates with a space between the fixed head and the adjacent tubesheet. A third fluid outlet extends through the floating head flange and communicates with a space between the adjacent tubesheet and the face of the hub portion.

In the operation of the separator device, a fluid stream containing permeate and nonpermeate fluids is directed into the open end of the distributor tube under pressure. From the distributor tube the permeate fluid moves through the walls of the hollow fibers in the bundle and is carried out of the separator device through the second and third fluid outlets. But, the nonpermeate fluid moves through the spaces between the fibers and is carried out the separator device through the first fluid outlet. The operation of this device also involves directing a stream of pressurized fluid into a space defined between the shoulder face of the floating head flange and the front face of the floating head. The pressurized fluid exerted against the floating head provides a balancing force for the pressure acting against the rear face of the tubesheet that is in contact with the floating head.

Control of the balancing force is achieved primarily by choosing an appropriate size (surface area) for the head, and by controlling the pressure applied against the head. Sometimes, both factors are required. In the present invention the floating head is pressurized by fluid obtained from a pressure tap located in the separator device. The invention also contemplates obtaining the pressurizing fluid from a source not located in the separator device.

DESCRIPTION OF THE INVENTION

Figure 1:
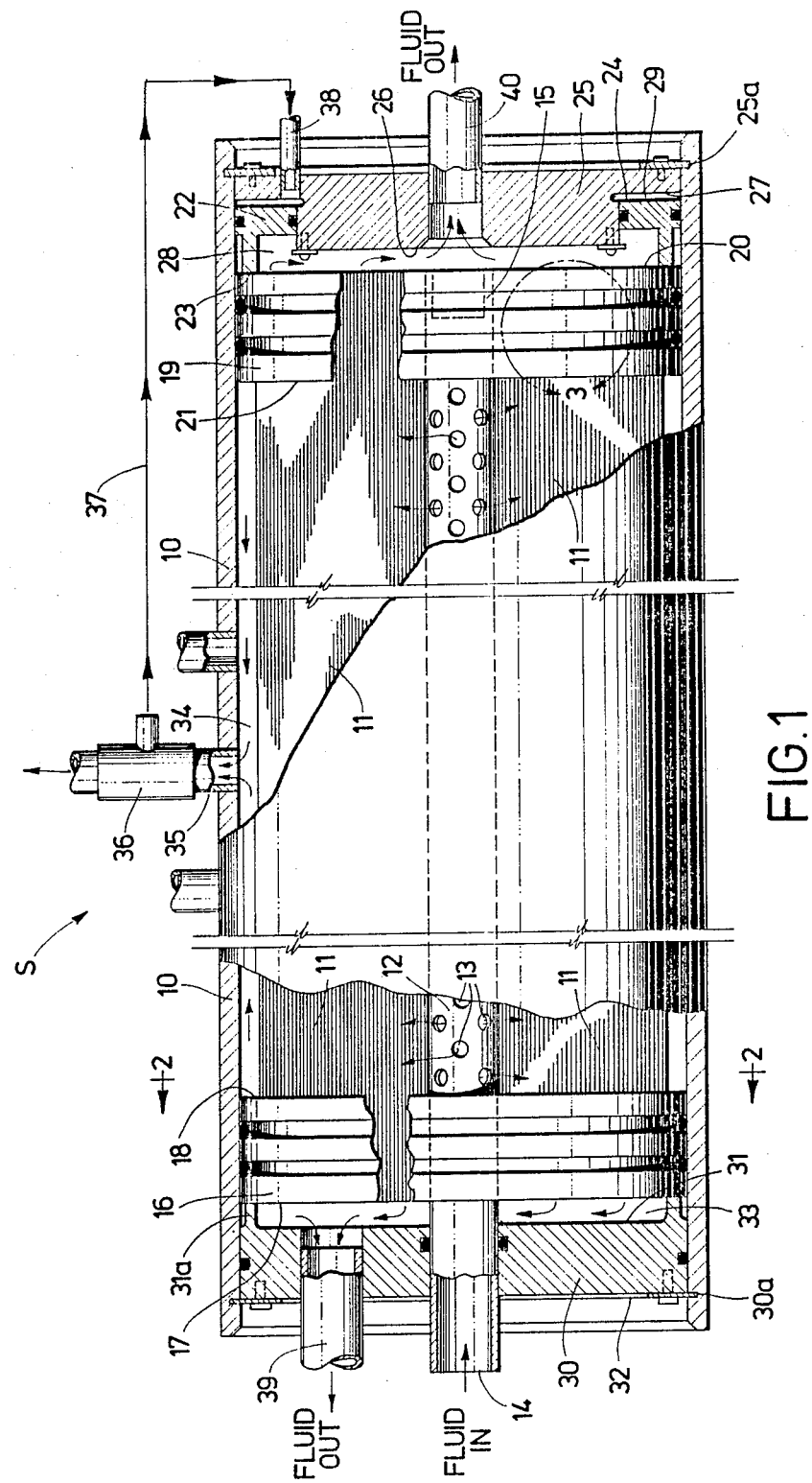
FIG. 1 is an elevation view, mostly in section, of one embodiment of the fluid separator device of this invention.
Figure 2:
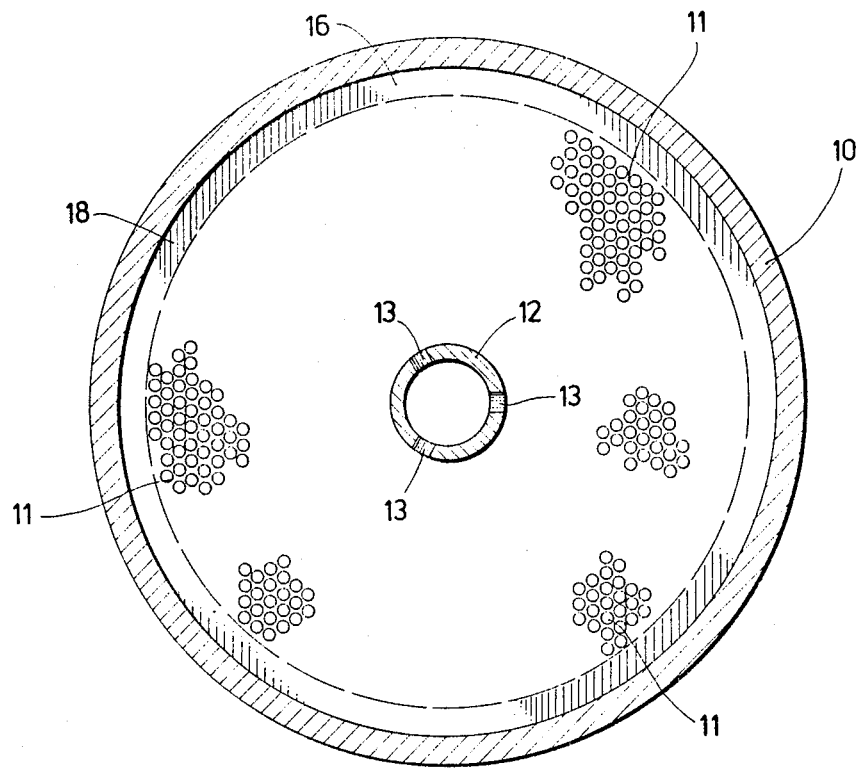
FIG. 2 is a view of the separator device, as taken on line 2—2 of FIG. 1.

In the drawings, referring particularly to FIG. 1, the fluid separator device of this invention is indicated generally by the letter S. The device includes a hollow fiber module that fits inside an elongate housing 10. The module itself is made up of a bundle of hollow fibers arranged in side-by-side relation, with interstices between the fibers. Individual fibers in the bundle are designated by the numeral 11. Extending lengthwise through the center of the fiber bundle is a distributor tube 12, which is a length of tube with numerous perforations 13 in it. The distributor tube 12 is open at one end, as indicated by numeral 14, and is closed off by a plug 15 at the opposite end.

At each end of the bundle, the fibers 11 are potted with a solid body of resin that defines a tubesheet. One of the tubesheets, indicated by numeral 16, is at the left-hand end of the fiber bundle, as shown in FIG. 1. Numeral 17 refers to the outside face of this tubesheet, and the inside face is indicated by numeral 18. At the other end of the fiber bundle is a tubesheet 19, which has an outside face 20 and an inside face 21. The separator device S includes a member referred to as a floating head 22, that fits inside housing 10, and it can move back and forth inside the housing. A raised portion of head 22 has a flat surface that defines the rear face 23 of this head member. On the other side of head 22 is a flat surface that defines a front face 24 of this member.

As shown in the drawing, the rear face 23 of head 22 is in contact (seats against) the outside face 20 of tubesheet 19. Another member that fits inside housing 10 is a floating head flange 25, which is held in place in the housing by a lock ring 25a. Flange 25 has a hub portion enclosed by the floating head 22, and the floating head is in contact with the hub. Below the hub portion on flange 25 is a shoulder portion. The longer flat surface of the hub portion defines a hub face 26, and the top surface of the shoulder portion defines a shoulder face 27.

The position of flange 25 in relation to tubesheet 19 defines a space 28 between the outside face 20 of the tubesheet and the hub face 26 of the flange. Another space 29 is defined between the shoulder face 27 of the flange and the front face 24 of the floating head 22. At the other end of the separator device S is a fixed head 30 that is held in place in the housing by a lock ring 30a. The surface of head 30 adjacent to the outside face 17 of tubesheet 16 is a front face 31; the opposite surface is a rear face 32. As shown in the drawing, the front face 31 has an integral rib 31a, which is in contact with tubesheet 16 and a space 33 is defined between face 31 of the head member and the outside face 17 of tubesheet 16.

The bundle of hollow fibers 11 is positioned in housing 10 such that a space 34 is defined between the external surface of the bundle and the inside surface of the housing. The nonpermeate fluids are carried out of the separator device S through one or more fluid outlets. The actual number of outlets used for this purpose depends on the flowrate of the nonpermeate fluids, and other conditions. As shown in FIG. 1, a single outlet 35, located in housing 10, is provided for carrying the nonpermeate fluids out of the separator device.

Means for carrying the permeate fluids out of the separator device S are provided by fluid outlets at each end of the device. One of these outlets, indicated by numeral 39, extends through the fixed head 30 and communicates with the space 33 between the head and the tubesheet 16. The other outlet, indicated by numeral 40, extends through the floating head flange 25 and communicates with space 28 between tubesheet 19 and the hub face of the flange. As shown in FIG. 1, there are O-ring seals on tubesheet 16 and fixed head 30. At the opposite end of the separator device S, there are O-ring seals on tubesheet 19, floating head 22, and flange 30. These seals (not numbered) prevent fluids from leaking past the tubesheets, and from further leaking past the fixed head and floating head to the outside of the separator device.

Operation

To illustrate the practice of this invention, a typical operation of the fluid separator device will now be described. In this operation a stream of compressed air is passed into the separator device S to separate oxygen ($O_2$) from nitrogen ($N_2$), and thus provides a separate stream of enriched $O_2$ and $N_2$. To start the operation, the stream of air to be separated into its $O_2$ and $N_2$ components is passed into the open end 14 of distributor tube 12 at high pressure. For the practice of this invention, the air stream should be at a pressure of from about 10 to 1000 pounds per square inch absolute (psia). The preferred range is from about 70 to 175 psia.

Figure 3:
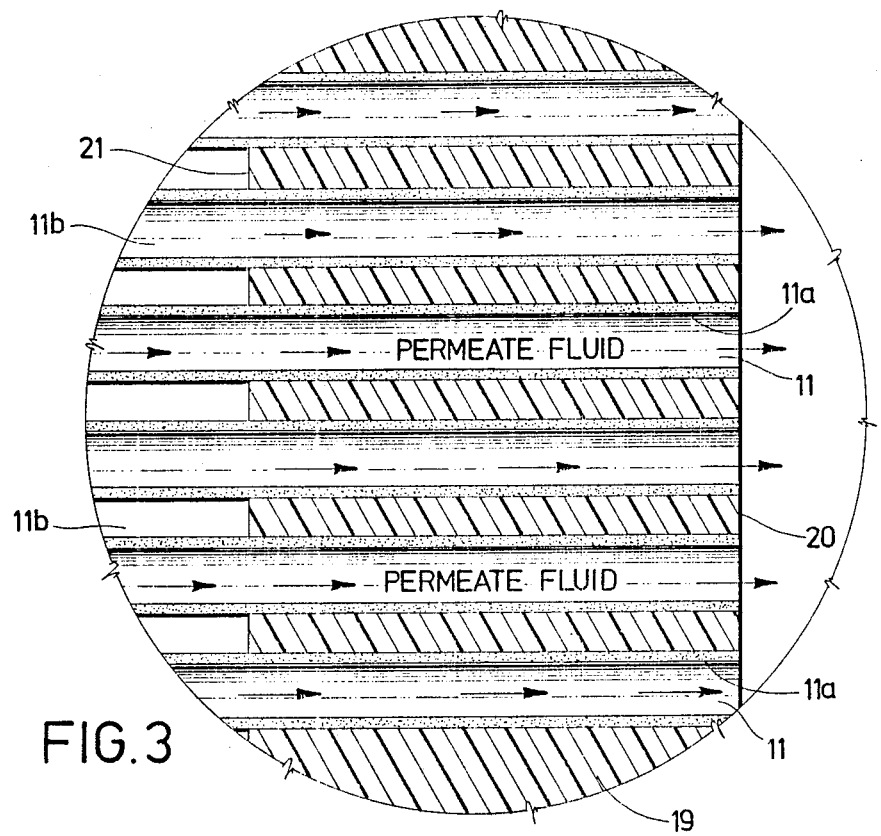
FIG. 3 is a detail view of one section of the separator device, as indicated by the circular line in FIG. 1.
Figure 4:
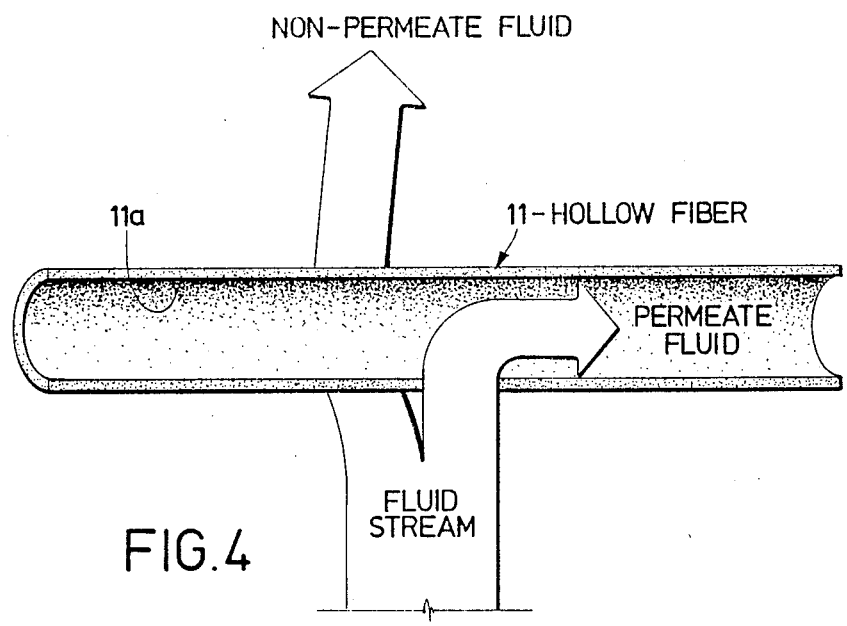
FIG. 4 is a fragmentary schematic view of a hollow fiber component of the separator device. This view illustrates how the hollow fibers separate permeate fluids from nonpermeate fluids in the practice of this invention.

From the distributor tube 12, the air passes out into the fiber bundle through the perforations 13 in the tube. As the air moves through the bundle, the $O_2$ readily permeates the walls of the fiber bundle 11 and is carried through the bore 11a of each fiber (as shown in FIGS. 3 and 4 of the drawing) toward both ends of the separator device. At one end the $O_2$ moves through tubesheet 19 and space 28 and out of the separator device through outlet 40. At the other end the $O_2$ passes through tubesheet 18 and space 33 and leaves the separator device through outlet 39. As the oxygen-enriched air leaves the separator device, it can be collected, or carried to a point of use, by conventional means known to the art.

The structure of the hollow fibers 11 is such that the $N_2$ in the compressed air doesn't readily perpermeate the fiber walls. Instead, the $N_2$ bypasses the fibers, so that it moves through the interstices (spaces) between the fibers, into the space 34, and passes out of the separator device through fluid outlet 35. The $N_2$ component can also be collected or carried to a point of use, as is done with the oxygen-enriched air.

As illustrated in FIG. 1, there is a pressure tap 36, located in housing 10, adjacent to the outlet 35 for the nonpermeate fluid. A line 37 connects the pressure tap to a fluid inlet 38 that extends into space 29 between the floating head 22 and the shoulder of flange 25. When line 37 and inlet 38 are filled with the nonpermeate fluid, the static pressure of the fluid acts against the front face 24 of floating head 22. This action keeps the rear face 23 of the head tight against the outside face 20 of tubesheet 19, and thus counterbalances the pressure load against the inside face 21 of tube sheet 19. Another feature of head 22 is its ability to move back and forth (that is, to float) within housing 10. This feature allows the floating head to adjust itself to hollow fiber modules of several different lengths. The pressure load acting against the inside face 18 of tubesheet 16 is compensated by the fixed head 30, in which the integral rib 31a seats against the outside face 17 of this tubesheet.

In the practice of this invention, suitable materials for the polyolefinic hollow fibers include the acetate, triacetate, propionate, nitrate and other cellulose esters, including the mono-, di- and tri-esters and mixtures of such esters; cellulose ethers, such as methyl, ethyl, hydroxy-alkyl, etc.; regenerated cellulose; polyvinyl alcohols; polysaccharides and the like. The separator device described herein is useful for separating any of several fluids from a mixture of fluids, as determined by the specific properties of the hollow fibers.

The practice of this invention also includes situations in which it may be desirable to reverse the sequence in which the fluid mixture (which is to be separated into individual components) is fed into the separator device. For example, if the fluid is air, the air is passed into the separator device S through outlet 35, and the nonpermeate fluid ($N_2$) leaves the separator through the open end 14 of distributor tube 12. But the permeate fluid ($O_2$) permeates the walls of the fibers in bundle 11 and the $O_2$ is carried out of the separator device through the outlets 39 and 40, as in the separator device illustrated in FIG. 1. This embodiment would also include the floating head 22 and fixed head 30, to compensate for the pressure load against the tubesheets 16 and 19.

As now illustrated in FIG. 1, the floating head 22 is positioned at the right end of the separator device S, so that it is in contact with and provides support for the tubesheet 19. The separator device can function equally well by positioning the floating head 22 at the other end (the left end) of the device, so that it provides support for tubesheet 16. In this embodiment, the fixed head 30 would be positioned at the right end of the separator device, to provide support for tubesheet 19.

The invention claimed is:

1. A hollow fiber device for separating individual fluids from a fluid stream containing a mixture of permeate fluids and nonpermeate fluids, the device comprising:

an elongate housing;

a hollow fiber module including an elongate, perforated, distributor tube;

the distributor tube having an open end and a closed end, the tube being enclosed by a bundle of spaced-apart hollow fibers, and the tube being adapted for carrying a fluid stream into the fiber bundle;

the fibers being fastened into a first tubesheet at one end of the bundle, and being fastened into a second tubesheet at the opposite end of the bundle, each tube-sheet being fabricated of a resin material, and each tubesheet having an inside face and an outside face;

the device including a floating head that fits inside one end of the housing, the floating head being movable backward and forward inside the housing, the floating head having a front face and a rear face, and the rear face being in contact with the outside face of the first tubesheet;

the device including a floating head flange that fits inside the housing, the flange including a hub poriton enclosed by and in contact with the floating head member, the flange including a shoulder portion, and the hub and shoulder portions each having a surface defining a face;

the floating head flange being positioned in the housing such that a space is defined between the hub face and the outside face of the first tubesheet, and a space being defined between the shoulder face of the floating head flange and the front face of the floating head;

the device including a fixed head that fits inside the housing at the end opposite to the floating head, the fixed head having a front face and a rear face, the front face including a rib portion in contact with the second tubesheet, and a space being defined between the front face of the fixed head and the outside face of the second tubesheet;

the hollow fiber bundle being positioned inside the elongate housing, such that a space is define between the external surface of the bundle and the inside surface of the housings;

the device including at least one first fluid outlet located in the elongate housing, said outlet communicating with the space between the fiber bundle and the housing;

the device including at least one second fluid outlet that extends through the fixed head and communicates with the space between the front face of the fixed head and the outside face of the second tubesheet;

the device including at least one third fluid outlet that extends through the floating head flange and commmunciates with the space between the outside face of the first tubesheet and the hub face of the floating head flange;

the device including a fluid inlet means that communicates with a source of pressurized fluid, and with the space between the shoulder face of the floating head flange and the front face of the floating head;

wherein, in operation, the fluid stream containing permeate and nonpermeate fluids is directed into the open end of the distribution tube at a pressure of from about 10 to about 1000 psia;

the permeate fluid flows from the distributor tube through the walls of each hollow fiber and is carried out of the device through the second and third fluid outlets;

the nonpermeate fluid flows from the distributor tube through the spaces between the hollow fibers in the bundle, and is carried out of the device through the first fluid outlet; and a second fluid stream, at a pressure of from about 2 to about 25 psia, is directed through the fluid inlet means into the space between the shoulder face of the floating head flange and the front face of the floating head, so that said fluid is in contact with the front face of the floating head.

2. The separator device of claim 1, including a pressure tap that communicates with the nonpermeate fluid in the separator device, and the fluid inlet menas being connected into the pressure tap, so that part of the pressurized nonpermeate fluid in the separator device is directed into the space between the shoulder face of the floating head flange and the front face of the floating head.

3. A method for separating individual fluids from a fluid stream that contains a mixture of permeate fluids and nonpermeate fluids, comprising the steps of:

placing a bundle of spaced apart hollow fibers inside an elongate housing, to define a separator device;

installing an elongate, perforated distributor tube in the center of the hollow fiber bundle;

fastening each hollow fiber into a first tubesheet at one end of the fiber bundle, and into a second tubesheet at the opposite end of the fiber bundle;

installing a floating head inside the housing, the head being in contact with a surface of the first tubesheet;

positioning a flange member inside the housing, such that the flange member is in contact with the floating head, the flange including a shoulder portion having a face that is spaced from the floating head;

positioning a fixed head inside the housing, with the fixed head being in contact with the second tubesheet;

installing a first fluid outlet in the housing, said outlet communicating with a space between the fiber bundle and the housing;

installing a second fluid outlet in the fixed head, said outlet communicating with a space between the fixed head and the second tubesheet;

installing a third fluid outlet in the flange member, said outlet communicating with a space between the first tubesheet and the flange member;

installing a fluid inlet means inside the housing adjacent to the floating head, sid inlet communicating with a source of pressurized fluid and with the space between the floating head and the flange member;

directing the fluid stream containing the permeate and nonpermeate fluids into the distributor tube at a pressure of from about 10 to about 1000 psia;

flowing the permeate fluid from the distributor tube through the walls of each hollow fiber, and carrying said fluid out of the separator device through the second and third fluid outlets;

flowing the nonpermeate fluid through the spaces between the hollow fibers in the bundle and carrying said fluid out of the separator device through the first fluid outlet; and directing a second fluid stream through the fluid inlet means into the space between the flange member and the floating head, so that the fluid is in contact with the floating head.

4. The method of claim 3 in which a stream of air is directed into the distributor tube, the air containing oxygen as a permeate fluid, and nitrogen as a nonpermeate fluid.

* * * * *